Jan. 28, 1969  J. C. KOST  3,423,870
AUTOMATIC MOUSE TRAPS
Filed Aug. 19, 1965

United States Patent Office 3,423,870
Patented Jan. 28, 1969

3,423,870
AUTOMATIC MOUSE TRAPS
John C. Kost, Lemsford, Saskatchewan, Canada
Filed Aug. 19, 1965, Ser. No. 480,858
U.S. Cl. 43—69                                         6 Claims
Int. Cl. A01m 23/04

ABSTRACT OF THE DISCLOSURE

The rodent trap comprises a drowning container over which a platform providing a rodent path of travel is mounted for swinging between a horizontal position and and an inclined position in which a rodent chute into the container is formed. A rodent reception booth is mounted over the platform and has an open side entrance for rodent travel along said path. A bait dispenser is mounted on the booth and is actuable by each swinging of the platform into its inclined position to deposit a measured amount of primary bait adjacent a baffle on the platform at the beginning of said path, and means holding secondary bait on the platform within the booth toward the end of the path of travel.

---

This invention relates to improvements in animal traps and more specifically, but not necessarily limited to, mouse traps, and the primary object of the invention is to provide a trap of the character just described wherein means is provided to automatically dispense a measured amount of bait, referred to herein as primary bait intended for consumption by the mouse, and to offer an amount at a distance from the primary bait another bait, referred to herein as secondary bait, intended to entice the mouse to a zone wherein the mouse springs the trap and consequently fails to reach and consume the secondary bait.

A further object of the invention is to provide an improved trap of the character just described which can trap a large number of mice, one after another, without attention in that it re-baits and re-sets itself automatically after each catch and is provided with a container of a size sufficient to hold a whole colony of trapped mice.

A still further object of the invention is the provision of a trap that is suitable for use at a farm, factory, warehouse or residence, it being especially adaptable to farm use inasmuch as it includes in its structure certain components that are readily available on the average farm, such as used empty containers and used crank case oil or other drowning liquids.

A still further object of the invention is to provide a trap which avoids the health hazards of killing poisons in open containers and the unpleasant, unsanitary and inhumane aspects of conventional jaw-type traps which must be reset and re-baited after each mouse is caught.

Other objects and advantages of the invention will become apparent during the course of the following detailed description, taken in connection with the accompanying drawing forming a part of this specification, and in which drawing, FIG. 1 is a central vertical sectional view of my improved mouse trap showing in full lines the relationship of parts in the set position of the trap and in broken lines the relationship of parts in the "sprung" position just prior to actuation of the primary bait dispensing mechanism.

Figure 1:
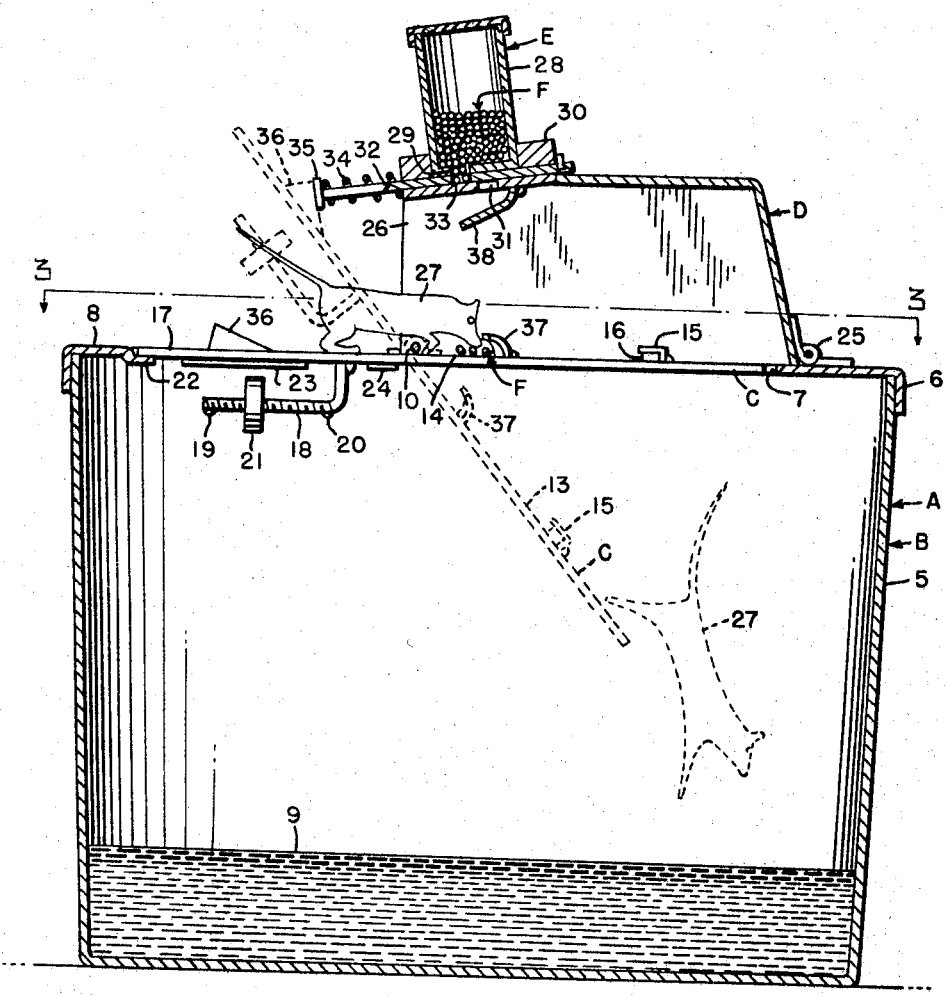
Figure 2:
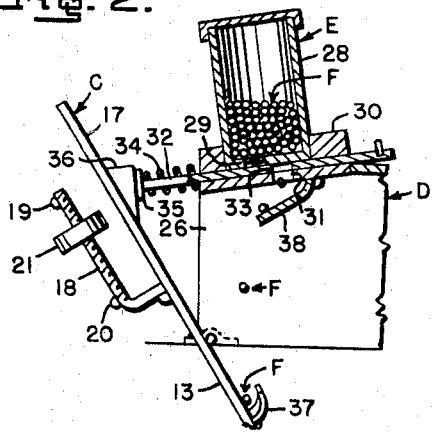
FIG. 2 is a fragmentary view in central vertical section showing the relationship of parts of the primary bait dispensing mechanism upon actuation.
Figure 3:
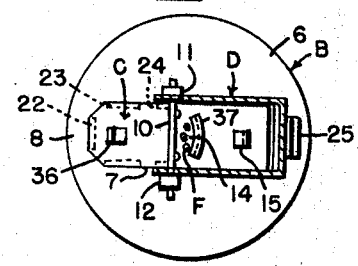
FIG. 3 is a reduced horizontal sectional view of the trap substantially along the line 3—3 of FIG. 1.

In the drawing which, for the purpose of illustration, shows only a preferred embodiment of the invention and wherein similar reference characters denote corresponding parts throughout the several views, the letter A generally designates the improved mouse trap which comprises a drowning container B, a hinged platform C and mouse reception booth D both mounted on the container B, and means E dispensing a measured amount of primary bait F onto the platform C each time the trap A catches a mouse.

The container B may comprise an empty 25-lb. grease pail 5 of the standard type usually available on farms and having a lid 6 provided with an elongate opening or slot 7 extending diametrically of the circular container lid 6 but terminating inwardly of the circumferential margin 8 of the lid. Partly filling the container is a suitable quantity of a drowning liquid 9 which may be water when the trap is used in heated building or in the summer time. Otherwise the drowning liquid 9 may be used oil or used anti-freeze.

Mounted on the container lid 6 as by a horizontal rod 10 and spaced bearings 11, 12 is the elongate platform C swingable between a horizontal or "set" position wherein the slot-shaped opening 7 is closed and an inclined or "sprung" position wherein one hinged end portion 13 of the platform C extends downwardly at an angle of approximately 60 degrees to the horizontal and forms a chute serving to precipitate a mouse from the platform and into the drowning liquid 9. Covering the elongate platform C is the mouse reception booth D which defines with the platform C a path of travel for the mouse across the hinge rod 10 to a primary bait consuming zone 14 and thence to a secondary bait location wherein a secondary bait holder 15 is mounted on the platform C. The secondary bait may be a small block of cheese 16 capable of being permanently gripped by the secondary bait holder 15. Affixed below the platform C at its opposite end portion 17 is a screw-threaded rod 18 having spaced burrs 19, 20 between which is adjustably threaded a balance weight 21 serving to normally bias the platform C toward its horizontal or "set" position and in order to limit the platform C against movement beyond the horizontal position, one or more flanges 22–24 may be left integral with the marginal edges of the slot-shaped opening 7 at the time that opening is formed in the lid 6.

The mouse reception booth D may be made of a suitable plastic material, is connected by a hinge 25 to the lid 6 to permit the booth D to be swung upwardly away from the platform C, for inspection and servicing, and is provided with an open end 26 opposite the hinge permitting the mouse 27 to enter the booth D in the direction of the path of travel leading in turn to the primary and secondary baits F, 16.

The means E for automatically dispensing a measured amount of primary bait F includes a primary bait container 28 having a suitable size aperture 29 in its bottom wall, and mounted on a slide guide 30 disposed at the top of the booth D and provided with an opening 31 out of alignment with the aperture 29 in the bottom wall of the primary bait container 28. Also provided is a slide strip 32 which is reciprocably slidable in the guide 30 between a first position wherein a hole 33 in the slide strip 32 aligns with the bottom aperture 29 of the primary bait container 28 and a second position wherein the slide strip hole 33 aligns with the slide guide opening 31.

Urging the slide strip 32 toward its first position is an expansion coil spring 34 that acts against an enlarged head portion 35 at the outer end of the slide strip 32. Mounted on the swinging platform C is a striker block 36 arranged to hit the enlarged head 35 of the slide strip 32 upon swinging of the platform C into its "sprung" position, and to insure that the blow of the striker block 36 will take effect and shift the slide strip 32 into its second position against the force of the spring 34, the assemblage of primary bait container 28, slide guide 30 and slide strip 32 is tilted downwardly in the direction of the upwardly swinging striker block 36. Mounted on the platform C adjacent the primary bait feed zone 14 is an arcuate baffle 37 that serves to retain the primary bait F against sliding off the platform C when the same is disposed in its inclined or "sprung" position.

Prior to operating the trap A, the same is made ready by seeing that a suitable volume of drowning liquid 9 is in the container 5, by placing a small block of cheese 16 in the secondary bait holder 15 and by shifting the slide strip 32 one or two times to deposit a small amount of primary bait F in the feeding zone 14 adjacent the baffle 37. Each time the slide strip 32 is shifted, a measured amount of primary bait F, preferably granulated wheat, equal to the volume of the hole 33 in the slide strip 32 is transferred to the opening 31 in the slide guide 30 and thence this measured amount of primary bait F falls, via a feed chute 38 affixed to the slide guide 30 into the primary feeding zone 14. From actual observation the trapping events occur as follows: the mouse 27 approaches the primary bait F and feeds momentarily, and at this point its sensitive nose is about two inches from the secondary bait 16 which it attempts to approach next. However, before the mouse 27 reaches the secondary bait 16, the platform C suddenly swings into its inclined or "sprung" position whereupon the mouse 27 topples into the liquid 9 below and quickly drowns. At this time, the booth D and upwardly inclined end portion 17 of the platform C serve to prevent escape of the mouse. At the same time, the striker block 36 hits the feed slide head 35, shifting the slide 32 and allowing a measured small amount of granulated wheat F to pour into the primary bait feeding zone 14 of the platform C which is still in its inclined or "sprung" position. Despite the inclination of the platform C, the bait F is held against sliding by the primary bait baffle 37 with the result that primary bait F is maintained on the platform ready for the next victim. Inasmuch as the mouse 27 has lost its hold and has dropped into the drowning liquid 9, the platform C is free to move back to its horizontal or "set" position under the biasing influence exerted by the balance weight 21. The mechanical operation of the trap A has been tested under various conditions and has been found to work well when placed on permanent floors of basements or sheds, in holes in dirt floors or cellars of buildings, in holes in the ground outdoors, or partially embedded in grain stored in granaries.

I claim:

1. A rodent trap comprising a container having a lid provided with an opening, a platform having opposite end portions and a hinge between said end portions and connected to the lid so the platform may swing between a horizontal set position wherein the lid closes the opening and an inclined sprung position wherein one of said platform end portions forms a chute into the container, means responsive to each swinging movement of said platform into said inclined sprung position to deposit a measured amount of primary bait onto the platform adjacent the hinge, a baffle mounted on the platform to prevent sliding of the primary bait into the container, means for securing secondary bait on said one platform end portion, said platform being normally biased for swinging movement toward its horizontal set position, and the weight of a rodent on said one end portion beyond said baffle being sufficient to overcome said bias and quickly swing said platform into its inclined sprung position.

2. A rodent trap comprising a container, a lid on the container having an opening, a platform having opposite end portions and being mounted on the lid for swinging movement between a horizontal position wherein the opening is closed and an inclined position wherein one of said end portions of the platform is tilted down forming a rodent chute, means responsive to each swinging movement of the platform into the inclined position to drop a measured amount of primary bait on said platform, a baffle holding said primary bait against sliding from said platform, means for holding secondary bait on said downwardly tiltable platform end portion beyond the baffle, said platform being biased to swing toward its horizontal position.

3. A rodent trap comprising a container, a lid on the container having an opening, a platform having opposite end portions and being mounted on the lid for swinging movement between a horizontal position wherein the opening is closed and an inclined position wherein one of said platform end portions is tilted down into the container forming a rodent chute, a rodent reception booth mounted on the lid over said one platform end portion and having a side opening accessible to the rodent from said other platform end portion, means mounted on the booth responsive to each swinging movement of the platform into its inclined position to drop a measured amount of primary bait on said platform, a baffle holding said primary bait against sliding from said platform, means holding secondary bait on said downwardly tiltable platform portion beyond the baffle, said platform being biased to swing forward its horizontal position, and being tiltable by the weight of a rodent on said one platform end portion between said baffle and said secondary bait.

4. A rodent trap comprising a container, a lid on the container having an opening, a platform having an end portion mounted on the lid for swinging movement between a horizontal position aligning with the opening and a downwardly tilted position wherein said end portion forms a rodent chute directed into the container, a rodent reception booth mounted on the lid over said platform end portion and having a side opening permitting rodent ingress into the booth in the direction of travel along said chute, means mounted on the booth actuable by swinging movement of the platform into its tilted position for dropping a measured amount of primary bait on said platform, adjacent the booth ingress opening, a baffle holding said primary bait against sliding off the platform, means holding secondary bait interiorly of the booth, said platform being normally biased toward its horizontal position and tiltable into its inclined position by the weight of a rodent within the booth.

5. In a rodent trap of the type wherein a platform provides a path of travel for a rodent and is mounted over a container to swing downwardly from a horizontal position into an inclined position thus forming a chute into the container for a rodent on the platform, means actuable by each downward swinging movement of the platform into its inclined position to deposit a measured amount of primary bait at the beginning of the path of travel provided by the platform, and means holding secondary bait on the platform toward the end of said path of travel.

6. In a rodent trap of the type wherein a platform provides a path of travel for a rodent and is mounted over a container to swing downwardly from a horizontal position into an inclined position thus forming a chute into the container for a rodent on the platform, a rodent reception booth mounted over the platform and having an open side entrance permitting rodent travel into the booth along said path, means actuable by each downward swinging movement of the platform into its inclined position to deposit a measured amount of primary bait at the beginning of the path of travel, and means holding secondary bait within the booth toward the end of the path of travel.

References Cited

UNITED STATES PATENTS

| 1,428,918 | 9/1922 | Spieth | 43—69 |
| 1,556,136 | 10/1925 | Wahlstrom | 43—70 |
| 1,743,614 | 1/1930 | Morrison | 43—69 |
| 1,889,276 | 11/1932 | Dorrien | 43—69 |

WARNER H. CAMP, *Primary Examiner.*

U.S. Cl. X.R.

331—142